United States Patent
Hawkins

(10) Patent No.: US 10,341,278 B2
(45) Date of Patent: Jul. 2, 2019

(54) ADAPTIVE PRESENTATION OF COMMENTS BASED ON SENTIMENT

(71) Applicant: Flipboard, Inc., Palo Alto, CA (US)

(72) Inventor: Guy Hawkins, Palo Alto, CA (US)

(73) Assignee: Flipboard, Inc., Palo Alto, CA (US)

(*) Notice: Subject to any disclaimer, the term of this patent is extended or adjusted under 35 U.S.C. 154(b) by 365 days.

(21) Appl. No.: 15/231,676

(22) Filed: Aug. 8, 2016

(65) Prior Publication Data

US 2018/0041458 A1 Feb. 8, 2018

(51) Int. Cl.
*H04L 12/58* (2006.01)
*H04L 29/08* (2006.01)
*G06F 17/24* (2006.01)
*G06Q 30/02* (2012.01)
*G06Q 50/00* (2012.01)

(52) U.S. Cl.
CPC .......... *H04L 51/16* (2013.01); *G06F 17/241* (2013.01); *G06Q 30/02* (2013.01); *G06Q 50/01* (2013.01); *H04L 51/12* (2013.01); *H04L 51/32* (2013.01); *H04L 67/22* (2013.01)

(58) Field of Classification Search
CPC .......... H04L 51/16; H04L 51/12; H04L 51/32; H04L 67/22; G06F 17/241; G06Q 30/02; G06Q 50/01
See application file for complete search history.

(56) References Cited

U.S. PATENT DOCUMENTS

2011/0145219 A1* 6/2011 Cierniak .......... G06F 17/30867
707/709

* cited by examiner

*Primary Examiner* — Abdulkader M Alriyashi
(74) *Attorney, Agent, or Firm* — Fenwick & West LLP

(57) ABSTRACT

A computer-implemented method is disclosed for determining, for comments associated with a content item, response likelihood scores indicating likelihood of a user responding to the comments, and presenting the comments to the user according to the determined response likelihood scores. A response likelihood score of the user responding to a comment is determined according to an emotion score associated with the comment and a user propensity of the user responding to comments with similar emotion scores for a topic of the content item. The comments associated with the content item are ranked based on the response likelihood scores associated with the comments. An arrangement of the comments can be determined based on the rankings of the comments, and the comments can be presented to the user according to the determined arrangement.

16 Claims, 6 Drawing Sheets

100

ADAPTIVE PRESENTATION OF COMMENTS BASED ON SENTIMENT

BACKGROUND

The disclosure generally relates to the field of presenting content in a digital magazine, and more specifically to adaptively presenting comments based on sentiments towards comments and a topic of a content item in the digital magazine.

Digital distribution channels disseminate a wide variety of digital content including text, images, audio, links, videos, and interactive media (e.g., games, collaborative content) to users. Recent development of mobile computing devices such as personal computers, smart phones, tablets, etc., enables users to access numerous content items in various forms, and provide feedback for the content items. Through comments, users can present opinions towards a content item, and receive opinions of other users towards the content items. In addition, users can provide response to comments from other users to exchange opinions.

As a number of users viewing a content item increases, a challenge exists in presenting comments associated with the content item to a user. Specifically, a conventional approach of presenting comments cannot effectively distinguish between (i) comments, to which a user may likely respond to provide responses, and (ii) comments, to which a user may not likely respond to provide any response. Hence, a fewer number of comments, to which a user may likely to respond, may be shrouded by a larger number of comments that a user may not likely to respond to. As a result, it may be difficult for a user to locate comments, to which a user may likely to respond, from comments presented through the existing approach, thereby discouraging the user from providing comments.

SUMMARY

A computer-implemented method is disclosed for determining, for comments associated with a content item, response likelihood scores indicating likelihood of a user responding to the comments, and presenting the comments to the user according to the determined response likelihood scores. In one embodiment, a response likelihood score of the user responding to a comment is determined according to an emotion score associated with the comment and a user propensity of the user responding to comments with similar emotion scores for a topic of the content item. An arrangement of comments displayed to a user can be determined based on response likelihood scores of the user providing responses to different comments, and the comments can be presented to the user according to the determined arrangement.

In one embodiment, an emotion score of a comment is obtained for determining a response likelihood score of the user responding to a subject comment. A subject comment is a comment to which other users provided response comments. An emotion score of the subject comment herein refers to a representation of sentiments of different users towards the subject comment. The sentiments of different users towards the subject comment can be determined by emoticons attached to response comments. The response comments can be provided by other users in response to the subject comment. For example, other users can express empathy towards the subject comment by providing a response comment and attaching an emoticon representing happiness (e.g., a smiling face) to the response comment, and express animosity towards the subject comment by attaching an emoticon representing resentment (e.g., an angry face) to the response comment. Based on emoticons attached to response comments of the subject comment, sentiments of different users towards the subject comment can be determined.

In one embodiment, a user propensity of a user providing response comments is obtained for determining a response likelihood score of the user responding to a subject comment. The user propensity is determined based on a history of the user providing response comments in response to comments with certain emotion scores and a topic of the content item. For example, a user may have provided a higher number of response comments to comments that received emotion scores representing high animosity for a given topic, but may have provided a fewer number of response comments to comments that received similar emotion scores for a different topic. Based on the user history of providing response comments to comments with certain emotion scores for a given topic, and an emotion score of the subject comment, a response likelihood score of the user responding to the subject comment can be determined.

In one embodiment, a non-transitory computer-readable storage medium storing executable computer program instructions is disclosed. The non-transitory computer-readable storage medium stores executable computer program instructions for determining, for comments associated with a content item, response likelihood scores indicating likelihood of a user responding to the comments, and presenting the comments to the user according to the determined response likelihood scores as disclosed herein.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

Example Digital Magazine System Environment

Figure 1:
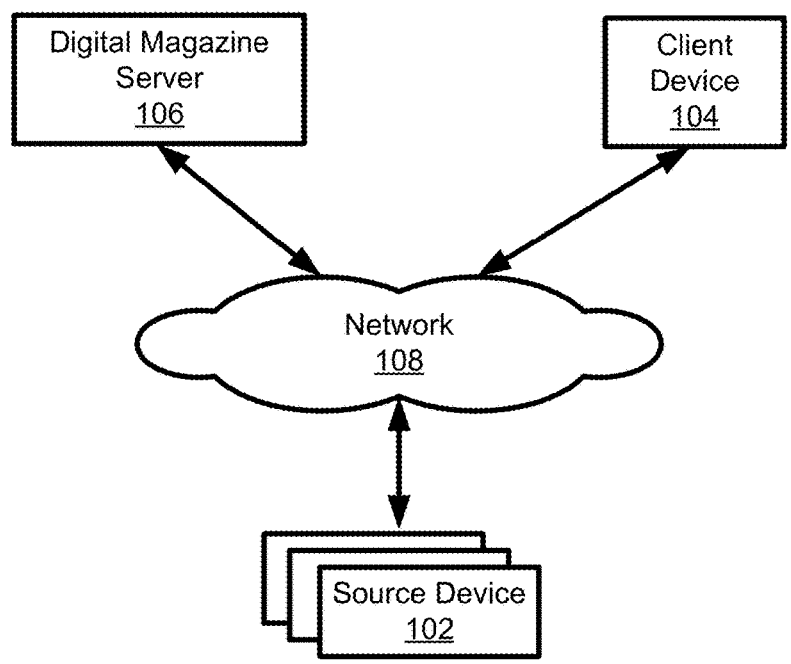
FIG. 1 is a block diagram of a system environment for presenting content items and comments associated with the content items via a digital magazine according to one embodiment.

FIG. 1 is a block diagram of a system environment 100 for organizing and presenting content items via a digital magazine to a user of the digital magazine according to one embodiment. The system environment 100 shown in FIG. 1 includes one or more source devices 102, a network 108, a client device 104, and a digital magazine server 106. In alternative embodiments, different and/or additional components may be included in the system environment 100.

A source device 102 is a computing system capable of providing various types of content to a client device 104. Examples of content provided by a source device 102 include text, images, video, or audio on web pages, web feeds, social networking information, messages, or other suitable data. Additional examples of content include user-generated content such as blogs, tweets, shared images, video or audio, social networking posts, and social networking status updates. Content (e.g., stories about news events, product information, entertainment, or educational material) provided by a source device 102 may be received from a publisher and distributed by the source device 102. For convenience, content from a source device, regardless of its composition, may be referred to herein as an "article," a "content item," or as "content." A content item may include various types of content, such as text, images, and video.

The source devices 102, the digital magazine server 106 and the client device 104 communicate among each other through the network 108. The network 108 may comprise any combination of local area and/or wide area networks, using both wired and/or wireless communication systems. In one embodiment, the network 108 uses standard communications technologies and/or protocols. For example, the network 108 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 108 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 108 may be represented using any suitable format, such as hypertext markup language (HTML) or extensible markup language (XML). In some embodiments, all or some of the communication links of the network 108 may be encrypted using any suitable technique or techniques.

The client device 104 is a computing device capable of receiving user input as well as transmitting and/or receiving data via the network 108. In one embodiment, the client device 104 is a conventional computer system, such as a desktop or a laptop computer. Alternatively, the client device 104 may be a device having computer functionality, such as a personal digital assistant (PDA), a mobile telephone, a smartphone or another suitable device. In one embodiment, the client device 104 executes a program (or an application) allowing a user of the client device 104 to interact with the digital magazine server 106 through the network 108. For example, an application executing on the client device 104 communicates instructions or requests for content items to the digital magazine server 106 to modify content presented to a user of the client device 104. As another example, the client device 104 executes a browser that receives pages from the digital magazine server 106 and presents the pages to a user of the client device 104. While FIG. 1 shows a single client device 104 for simplicity, in various embodiments, any number of client devices 104 may communicate with the digital magazine server 106.

The digital magazine server 106 receives content items from one or more source devices 102, generates pages in a digital magazine by processing the received content items, and serves the pages to users of the client device 104. To provide content items to a user, the digital magazine server 106 generates one or more pages for presentation to a user based on content items obtained from one or more source devices 102 and information describing organization and presentation of content items. For example, the digital magazine server 106 determines a page layout including various content items based on information associated with a user and generates a page including the content items arranged according to the determined layout for presentation to the user via the client device 104.

Figure 2:
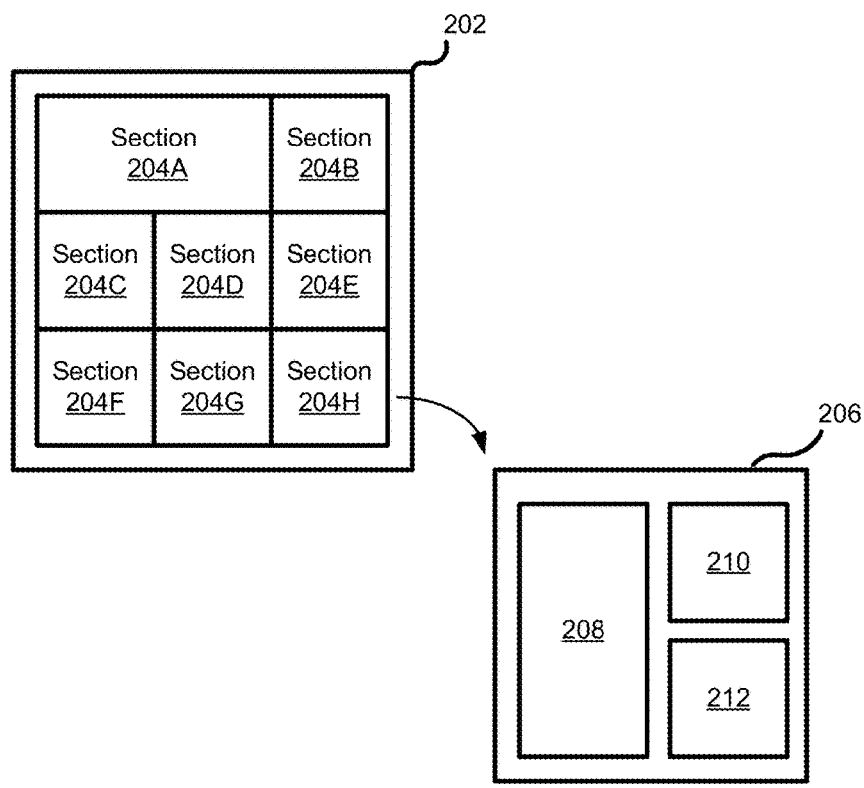
FIG. 2 is an example of a content browse page of a digital magazine according to one embodiment.

FIG. 2 illustrates an example page template 202 for a digital magazine to be displayed by a client device 104. In this example, each slot is rectangular, and each slot holds space for one content item of the digital magazine. Other templates having other combinations of slots may be used by the digital magazine server 106 to present one or more content items received from source devices 102. In some implementations, certain slots of some templates are reserved for particular types of content items. For example, some slots may be reserved for items containing images. As another example, a plurality of social network status updates may be commonly grouped together and displayed in a list as a single content item. In another example, some slots may be reserved for content items provided by publishers such as news organizations, magazines, or user generated content.

As shown in FIG. 2, a digital magazine server 106 may populate a slot in a page template 202 with a section 204 corresponding to the content item placed in the slot. A section 204 may include one or a combination of image and text describing the content item. For example, section 204A represents a table of contents describing sections of a digital magazine represented by sections 204B-204H. Section 204A may include text, such as "Cover Stories Featuring," followed by one or more identifiers associated with the various sections of the digital magazine. The identifier may refer to the name of a user of social network to which a user associated with client device 104 has formed a connection, association, or relationship via a social networking system. The identifier may also refer to a topic, newspaper, magazine, blog author, or other publisher. The identifier may further refer to a selection of user generated content organized as a collection. A collection may include any number of content items curated by a user of a digital magazine server 106. Content items included in a collection may be related topically and include text and/or images related to the topic.

Sections may be further organized into subsections, each subsection also represented by a section describing content items included in the subsection. In the example shown in FIG. 2, section 204H may point to a newspaper that includes three subsections represented by sections 208, 210, and 212. In one example, sections represented by subsections 208, 210, and 212 may refer to subsections including content items that cover local news, politics, and technology, respectively. In another example, sections represented by subsections 208, 210, and 212 may refer to subsection including content items that cover any other grouping of content items based on topic or other category. In addition, a content item displayed within a section may comprise a link to another section. This section might be useful, for example, to compose a personalized section "recommended for you" that includes content items of other sections and directs the user to consider reading or adding these other sections.

Figure 3A:
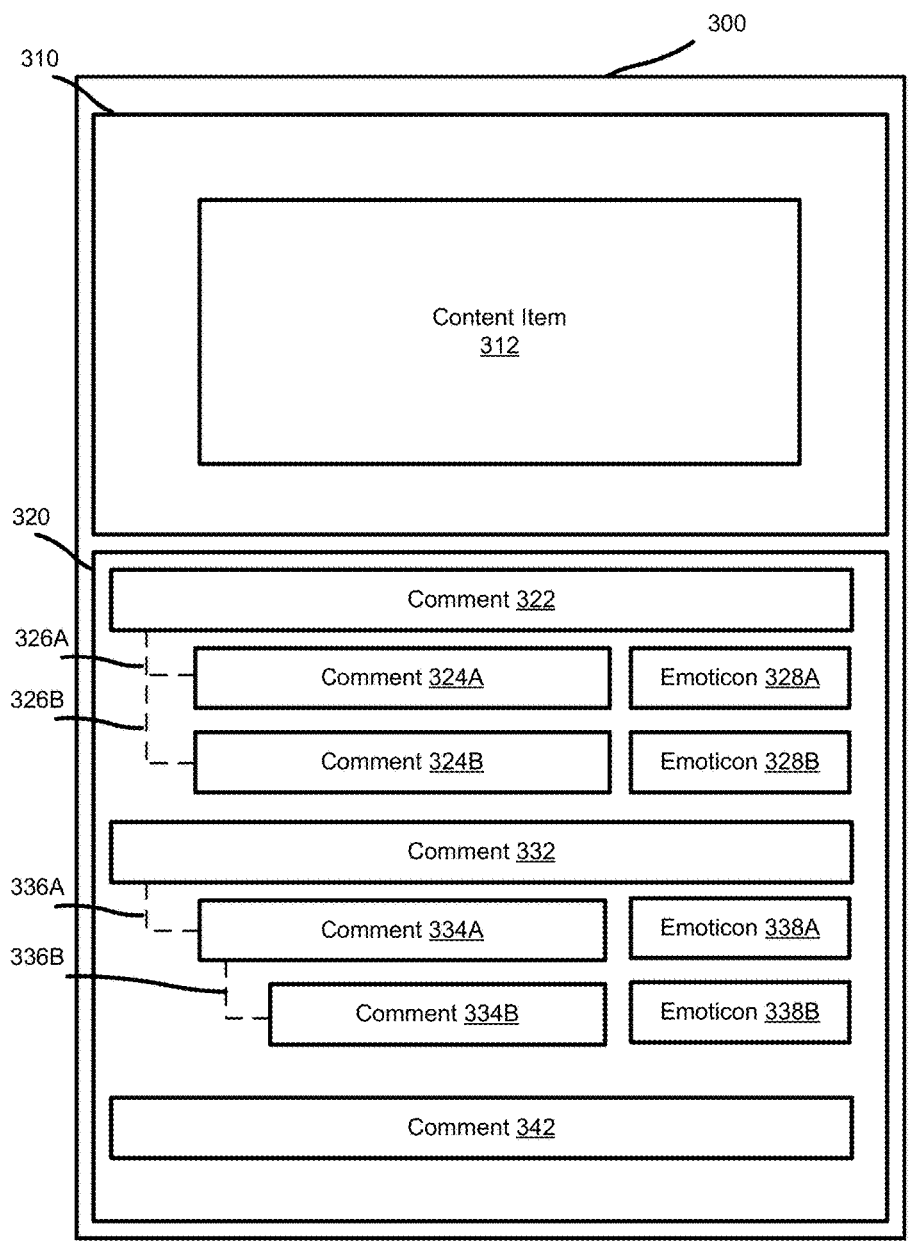
FIG. 3A is an example page for presenting a content item and comments associated with the content item according to one embodiment.

FIG. 3A is an example page 300 for presenting a content item and comments according to one embodiment. The example page 300 can be presented by a digital magazine application executed at the client device 104. In one embodiment, the page 300 includes a first section 310 for presenting a content item 312, and a second section 320 for presenting comments associated with the content item 312. Accordingly, a user of the client device 104 can consume the content item 312 presented in the first section 310, and review comments associated with the content item 312 presented in the second section 320. Moreover, the user can provide a response comment to one or more comments presented in the second section 320 of the page 300. In one embodiment, the comments in the second section 320 are presented in a manner that one or more comments that the user may likely to respond to are easily accessible. In other embodiments, the page 300 is presented in a different configuration than shown in FIG. 3A. For example, the sections 310, 320 may be presented in a different arrangement, or may include different, fewer, or additional sections.

In the first section 310, a content item 312 is presented. Examples of the content item 312 presented in the first section 310 include text, images, audio, links, videos, interactive media, etc.

In the second section 320, comments 322, 324A, 324B, 332, 334A, 334B, 342 are presented. The comments shown in section 320 form a hierarchical relationship. For example, the comments 322, 332, 342 are root comments that are provided in response to the content item 312, but not in response to other comments. Response comments (e.g., comments 324A, 324B, 334A, 334B) can be provided in response to root comments or other response comments. A comment, to which a response is provided, is herein referred to as a parent comment, and a comment provided in response to the parent comment is herein referred to as a child comment or a response comment. Herein, responding to a comment is also referred to providing a response or providing a response comment. In one embodiment, comments are presented in a hierarchical structure or in a threaded comment interface to allow the user to easily determine relationships (e.g., a parent comment or a child comment) among comments. For example, an indicator 326A indicates that the comment 324A is a response comment to the comment 322, and an indicator 326B indicates that the comment 324B is a response comment to the comment 322. Similarly, the indicator 336A indicates that the comment 334A is a response comment to the comment 332, and the indicator 336B indicates that the comment 334B is a response comment to the comment 334A.

In one embodiment, an emoticon is attached to a comment to allow a user providing the comment to express his/her emotion or sentiment towards a content item or another comment. An emoticon is a representation (e.g., an image, a mark, or a video) to express a person's feelings or moods. For example, an emoticon can be a smiling face to represent empathy or an angry face to represent animosity towards another comment or the content item 312. In FIG. 3A, an emoticon 328A is attached to the comment 324A by a first user providing the comment 324A to display the first user's sentiment in response to the comment 322, and an emoticon 328B is attached to the comment 324B by a second user providing the comment 324B to display the second user's sentiment in response to the comment 322. Similarly, an emoticon 338A is attached to the comment 334A by a third user providing the comment 334A to display the third user's sentiment in response to the comment 332, and an emoticon 338B is attached to the comment 334B by a fourth user providing the comment 334B to display the fourth user's sentiment in response to the comment 334A.

In one embodiment, the comments presented in the second section 320 are arranged and presented in a manner that one or more comments that the user may likely to respond to are easily accessible. For example, the comment 322 has higher likelihood of a user to provide a response comment than the comments 332, 342, and the comments 324A, 324B in a hierarchical relationship with the comment 322 may be presented above other comments in the second section 320. Similarly, the comment 332 has higher likelihood of the user to provide a response comment than the comment 342, and comments 334A, 334B in a hierarchical relationship with the comment 332 may be presented above the comment 342 in the second section 320.

In one embodiment, likelihood of a subject comment to be responded by a user can be determined based on emoticons provided by other users, who responded to the subject comment. In one aspect, a comment can be associated with an emotion score representing emotional perception towards the comment. Specifically, a parent comment is associated with an emotion score determined based on emoticons attached to its child comments. The emotion score can be represented in a numeric number, in a vector representation, or in other formats. In one approach, an emotion score indicates a total number of emoticons attached for each type of emoticon. Assuming for an example the emoticon 328A is a smiling face and the emoticon 328B is an angry face, an emotion score associated with the comment 322 can be represented in a vector as {'happy': 1, 'angry': 1}. In some embodiments, the emotion score of a comment represents a ratio of different types of sentiment in response to the comment. For example, the emotion score of the comment 322 is represented as {'happy': 50%, 'angry': 50%}, indicating 50% of users responded to the comment 322 attached emoticons representing happiness, and the other 50% of the user attached emoticons representing animosity.

Based on emotion scores of different comments, a user propensity of responding to comments with particular emotion scores can be determined. Moreover, likelihood of the user providing a response comment to the subject comment can be determined based on the user propensity and an emotion score of the subject comment. In one embodiment, the user propensity and the likelihood of the user providing the comment also depend on a topic of the content item 312, as further described in detail with respect to FIGS. 4 and 6 below.

Figure 3B:
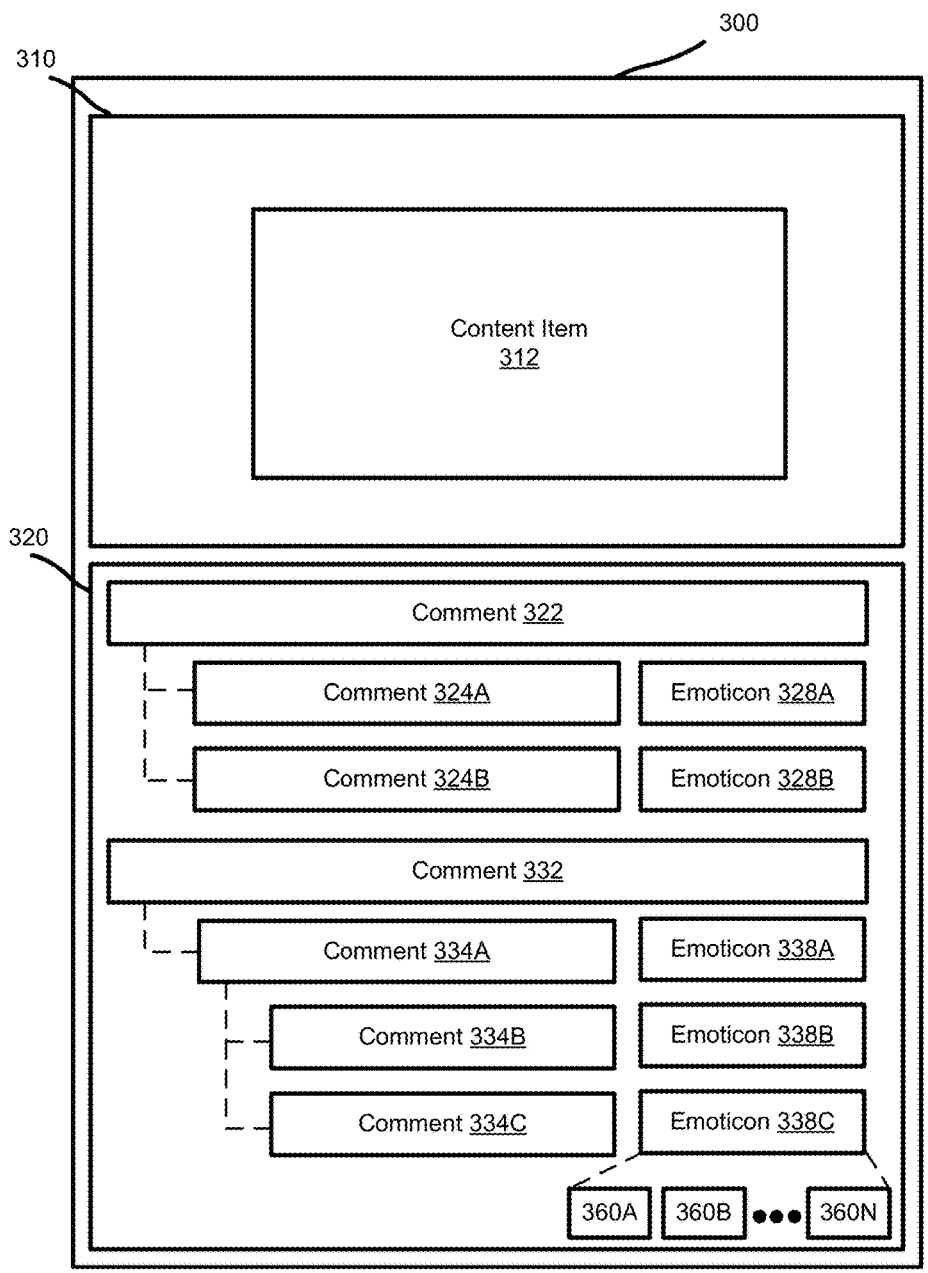
FIG. 3B is an example page in which a user provides a comment and attaches an emoticon to the comment according to one embodiment.

FIG. 3B is an example page in which a user provides a comment and attaches an emoticon to the comment according to one embodiment. The page 300 shown in FIG. 3B is substantially similar to the page 300 shown in FIG. 3A, except that a comment 334C is provided in response to the comment 334A, an emoticon 338C is attached to the comment 334C, and the comment 342 may be hidden from the page 300, because of the added comment 334C. The hidden comment 342 may be viewable by the user scrolling the second section 320.

In the example shown in FIG. 3B, the user provides the response comment 334C in response to the comment 334A, and attaches the emoticon 338C to the comment 334C to express sentiment in response to the comment 334A. To attach an emoticon, the user may initiate a process of inserting an emoticon, for example, by selecting a space on which an emoticon associated with the comment 334C can be displayed. In response to the user selecting the space, a list of candidate emoticons 360A . . . 360N may be displayed to the user. Example candidate emoticons 360 include a smiling face, an angry face, a frowning face, a crying face, a frightened face, etc. From the list of candidate emoticons 360, the user can select the emoticon 338C representative of the user's sentiment towards the comment 334A. After the user selection of the emoticon 338C from the list of candidate emoticons 360, the emoticon 338C is attached to the comment 334C and the list may disappear.

Figure 4:
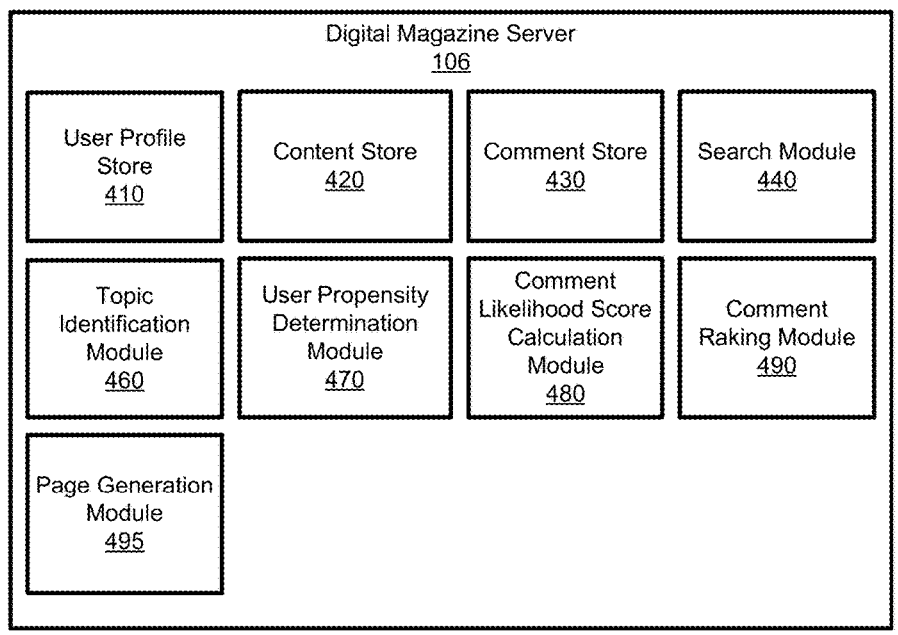
FIG. 4 is a block diagram illustrating a digital magazine server for presenting content items and comments associated with the content items via a digital magazine according to one embodiment.

FIG. 4 is a block diagram illustrating a digital magazine server 106 for presenting content items and comments associated with the content items via a digital magazine according to one embodiment. In one embodiment, the digital magazine server 106 includes a user profile store 410, a content store 420, a comment store 430, a search module 440, a topic identification module 460, a user propensity determination module 470, a comment likelihood score calculation module 480, a comment ranking module 490, and a page generation module 495. These components operate together to generate content pages according to selected page layouts and transmit the generated content pages including a content item and comments associated with the content item to the client device 104 for presentation. In other embodiments, the digital magazine server 106 may include different, fewer, or additional components.

The user profile store 410 stores user profiles. A user profile includes information about the user that was explicitly shared by the user and may also include profile information inferred by the digital magazine server 106. In one embodiment, a user profile includes multiple data fields, each describing one or more attributes of the corresponding digital magazine server user. Examples of information stored in a user profile include biographic, demographic, and other types of descriptive information, such as gender, hobbies or preferences, location, data describing interactions by a corresponding user with content items presented by the digital magazine server 106, or other suitable information.

The content store 420 stores various types of digital content from the source devices 102 or from users of the digital magazine server 106. Examples of content items stored by the content store 420 include a page post, a status update, a photograph, a video, a link, an article, a photograph, video data, and any other type of digital content.

The comment store 430 stores comments and information associated with each comment. Examples of information associated a comment include an emotion score, a hierarchical relationship with other comments, an identification of a content item associated with the comment, a topic of the content item, and an identification of a user provided the comment, or any combination thereof.

The search module 440 receives a search query from a user through the client device 104 and retrieves content items from one or more source devices 102 or from the content store 420 based on the search query. For example, content items having at least a portion of an attribute matching at least a portion of a search query are retrieved from one or more source devices 102.

The topic identification module 460 obtains a topic of a content item. The topic of the content item can be used to determine likelihood of a user providing a response to a comment of the content item. In one embodiment, a topic of a content item is indicated by a topic identification provided by a curator of the content item, and the topic identification module 460 determines the topic of the content item through the topic identification. In another embodiment, the topic identification module 460 obtains key words or tags associated with the content item, and determines the topic of the content item based on the key words or tags.

The user propensity determination module 470 obtains historical information of a user responding to comments based on topics of content items, and determines a user propensity of responding to comments based on the historical information of the user. The user propensity determination module 470 generates a model representing the user propensity of responding to comments for a given topic, and trains the model, for example, through machine learning to determine the user propensity. In one embodiment, the user propensity determination module 470 receives a new comment from a client device 104, and updates the user propensity according to the new comment. For example, when a user provides a response comment, the user propensity determination module 470 receives, from the client device 104, an identification of the user, an emotion score of a parent comment (i.e., a comment to which a user responded), and a topic of a content item associated with the response comment or the parent comment, then trains the model to update the user propensity of responding to comments with similar emotion scores for a given topic. For example, a user may have provided more responses to comments with positive sentiment for a first topic (e.g., "Trump"), than comments with negative sentiment towards the first topic. On the other hand, the user may have provided more responses to comments with more neutral or negative sentiment for a second topic (e.g., "Clinton"), than comments with positive sentiment towards the second topic.

The comment likelihood score calculation module 480 determines likelihood of a user responding to a subject comment based on a model representing a user propensity for a given topic, and an emotion score of the subject comment. Assuming for an example, three comments are provided for articles with a topic "Trump", where a first comment has an emotion score {'happy': 58, 'sad': 12, 'angry': 3}, a second comment has an emotion score {'happy': 9, 'sad': 44, 'angry': 29}, and a third comment has an emotion score {'happy': 0, 'sad': 11, 'angry': 31}. Because the user has been inclined to provide responses with positive sentiment (e.g., "happy") for the topic "Trump" determined according to the user propensity, the comment likelihood score calculation module 480 determines response likelihood scores of the first comment, the second comment, and the third comment to be 0.89, 0.53, and 0.01, respectively, where the response likelihood of '1' for a comment indicates the user will certainly respond to the comment, and the response likelihood of '0' indicates the user will certainly not respond to the comment.

Assuming for another example, three comments are provided for articles with a topic "Clinton", where a fourth comment has an emotion score {'happy': 42, 'sad': 29, 'angry': 5}, a fifth comment has an emotion score {'happy': 5, 'sad': 28, 'angry': 18}, and a sixth comment has an emotion score {'happy': 3, 'sad': 15, 'angry': 38}. Because the user will likely to respond to comments with neutral or negative sentiment (e.g., "sad" or "angry"), the comment likelihood score calculation module 480 obtains response likelihood scores of the fourth comment, the fifth comment, and the sixth comment to be 0.04, 0.46, and 0.75, respectively.

Advantageously, determining a user propensity of responding to comments based on a topic allows prediction on whether the user will provide a response or not to a comment. Specifically, a user likely views the content item and comments associated with the content item for the first time, hence the prediction of likelihood of the user providing a response becomes difficult. However, the user may have viewed other content items sharing a common topic, and comments associated with said other content items. By analyzing the user propensity of providing responses to comment associated with other content items for different topics, likelihood of the user providing a response to a comment can be predicted.

The comment ranking module 490 ranks the comments based on emotion scores of the comments for determining presentation of the comments. In one embodiment, the comment ranking module 490 ranks comments according to the response likelihood scores, such that comments with higher response likelihood scores receive higher ranks. In another embodiment, the comment ranking module 490 ranks comments per group, where comments in a group share a hierarchical relationship. Ranking comments per group rather than each comment individually enables comments to be arranged in a manner that a hierarchical relationship of the comments in the group to be easily represented. For example, a group emotion score of the comment 322 of FIG. 3A is obtained not only based on emoticons 328A, 328B, attached to its response comments 324A, 324B, but also based on emoticons attached to other comments (not shown) in a same hierarchical relationship. Similarly, a group emotion score of the comment 332 of FIG. 3B is obtained not only based on the emoticon 338A attached to the response comment 334A, but also based on emoticons (e.g., 338B) attached to other comments (e.g., 334B) in a same hierarchical relationship. A group response likelihood score (i.e., a likelihood of the user responding to one of comments in a group) of a subject group of comments can be obtained based on a group emotion score of the subject group of comments and a user propensity of responding to previous comments for the topic. A subject group of comments is a group of comments sharing a hierarchical relationship. By comparing group response likelihood scores of different groups of comments, a group of comments with a higher response likelihood score can be presented together according to the hierarchical relationship.

The page generation module 495 retrieves content items from one or more source devices 102 or from the content store 420 and generates a page including the content items and comments based on a layout. The layout describes a spatial arrangement of content items relative to each other on a section for presentation by a client device 104. In one embodiment, the page generation module 495 generates a section of the digital magazine including the content items identified based on the search query. The page generation module 495 may also receive rankings of comments from the comment ranking module 490, and determine an arrangement of the comments according to the rankings. The page generation module 495 transmits the page including the content items and the comments to the client device 104 for presentation.

Figure 5:
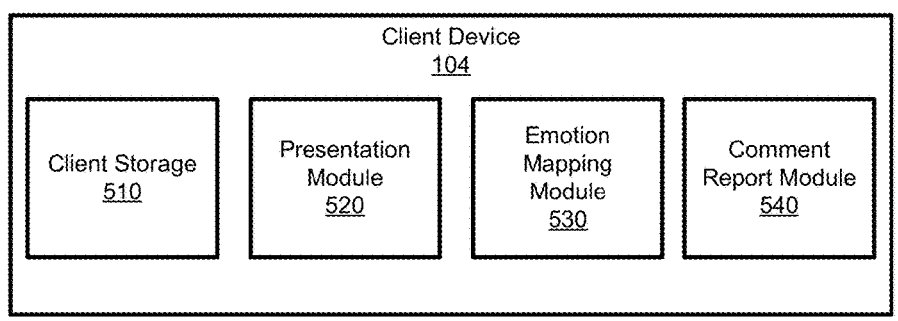
FIG. 5 is a block diagram illustrating a client device according to one embodiment.

FIG. 5 is a block diagram of a client device 104 according to one embodiment. In the embodiment illustrated in FIG. 5, the client device 104 includes a client storage 510, a presentation module 520, an emotion mapping module 530, and a comment report module 540. These components operate together to present content items and comments associated with the content items to a user of the client device 104. In other embodiments, the client device 104 may include different, fewer, or additional components.

The client storage 510 is a repository for storing data generated and received by the client device 104. For example, the client storage 510 receives information for presenting content pages including content items and comments from the digital magazine server 106, and stores the received information. Other data stored at the client storage 510 includes browsing history, search history, user preference, and data access information and authorization to the digital magazine server 106.

The presentation module 520 receives information describing a content page including content items and comments and instructions on how to present the content items and comments, and presents the content page to a user of the client device 104. In one embodiment, the comments are ranked, and the presentation module 520 presents the comments according to likelihood of a user responding to the comments such that comments, to which the user will more likely to respond, are presented in an area that is easily accessible by the user.

The emotional mapping module 530 receives a user input to attach an emoticon, and maps the emoticon with corresponding sentiment. For example, the emotional mapping module 530 maps an image showing a smiling face to happiness, an image showing a crying face to sadness, and an image showing an angry face to animosity. Accordingly, when a user attaches an emoticon to a response comment, the emotional mapping module 530 can determine sentiment of a user towards a parent comment.

The comment report module 540 reports to the digital magazine server 106 that a user responded to a comment with a certain sentiment for a topic. The comment report module 540 provides a new comment provided by the user, and an identification of a parent comment to which the user responded to the digital magazine server 106. In addition, the comment report module 540 updates an emotion score of the parent comment based on sentiment corresponding to the added emoticon attached to the new comment. The comment report module 540 provides an updated comment score of a comment to the digital magazine server 106. In addition, the comment report module 540 may provide an identification of the user provided the new comment, a topic of a content item, etc. Accordingly, the digital magazine server may update the comment store 430, and the user propensity of responding to comments.

Exemplary Operation

Figure 6:
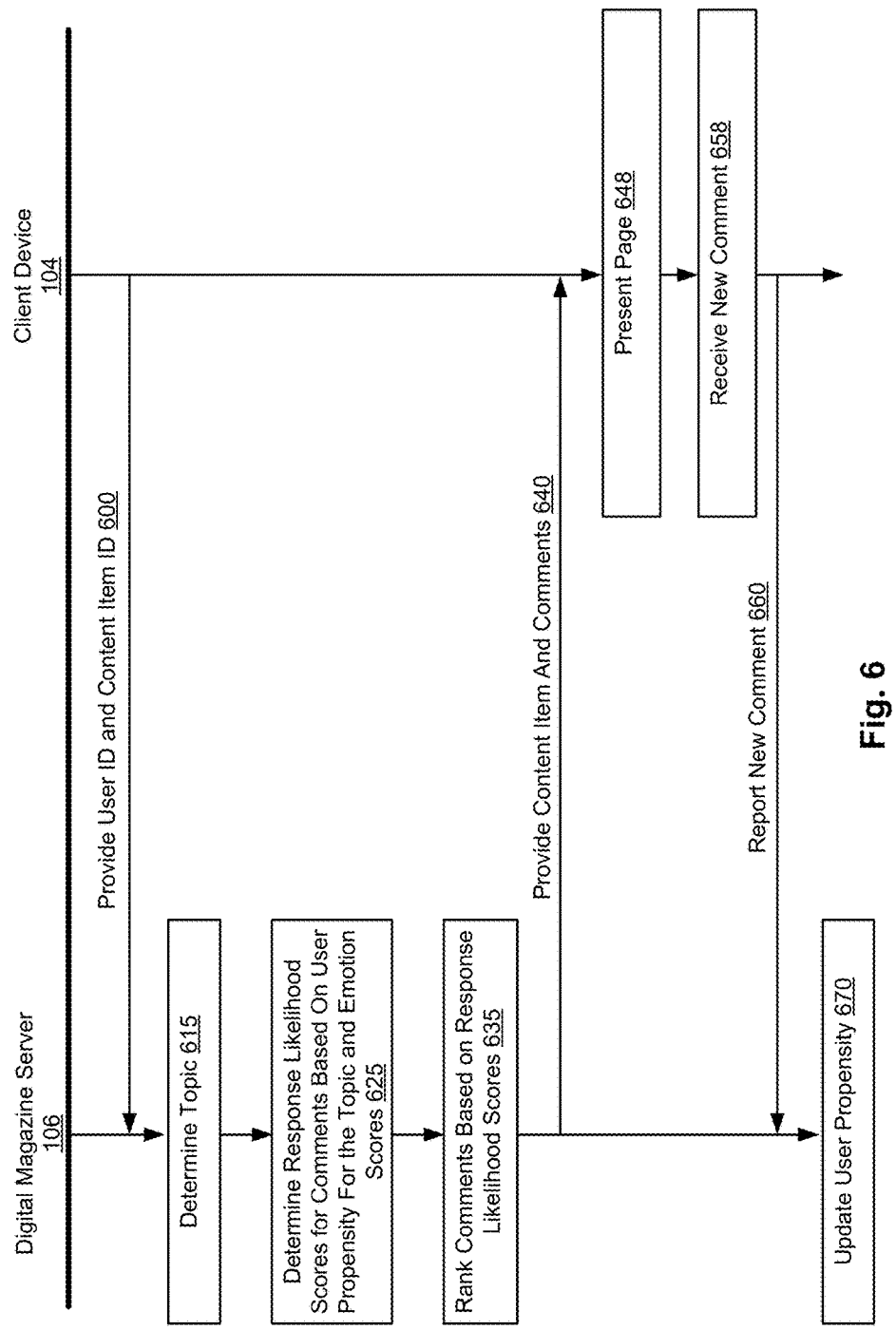
FIG. 6 is an interaction diagram illustrating a process between a digital magazine server and a client device for determining response likelihood scores of comments, and presenting the comments to the user according to the determined response likelihood scores according to one embodiment.

FIG. 6 is an interaction diagram illustrating a process between a digital magazine server 106 and a client device 104 of determining response likelihood scores of comments for determining an arrangement of the comments, and presenting the comments to the user according to the determined arrangement, according to one embodiment. In other embodiments, some or all of the steps may be performed by other entities. In addition, some embodiments may perform the steps in parallel, perform the steps in different orders, or perform different steps.

The client device 104 receives a user request to display a content item. For example, a user selects a subsection 208 of FIG. 2 to view a content item corresponding to the subsection 208. The client device 104 provides 600 a user request to view the content item to the digital magazine server 106. The request may include an identification of a user operating the client device 104, and an identification of the content item selected by the user.

The digital magazine server 106 receives the user request, and determines 615 a topic of the content item requested by the user. The topic can be identified by, for example, the topic identification module 460 of the digital magazine server 106. The digital magazine server 106 obtains comments associated with the content item, and determines 625 response likelihood scores for the comments based on a user propensity of responding to comments for the topic and emotion scores of the comments. The digital magazine server 106 ranks 635 the comments based on the response likelihood scores, and determines an arrangement of the comments for display to the user based on the ranking. In one aspect, the arrangement is determined such that comments with higher likelihood scores are presented in an area easily accessed by the user. The digital magazine server 106 provides 640 information describing a page including a content item and comments, and information describing an arrangement of the content item and the comments, to the client device 104.

The client device 104 presents 648 the page according to the information provided from the digital magazine server 106. Hence, comments that the user will likely to provide a response to are presented in the area easily accessible by the user. Conversely, comments that the user will not likely provide any response to may be hidden or presented in the area difficult for the user to access.

After reviewing comments, a user may provide a new comment in response to one of the comments presented. The client device 104 receives the new comment 658, and an emoticon attached to the new comment from the user. For example, the emotion mapping module 530 of the client device 104 identifies sentiment of the user towards the comment, to which the user responded, based on the emoticon. The client device 104 reports 660 the new comment to the digital magazine server 106. For example, the comment report module 540 of the client device 104 provides a new comment provided by the user, and an identification of a parent comment to which the user responded to the digital magazine server 106. In addition, the comment report module 540 updates an emotion score of the parent comment, and provides an identification of a user, an updated emotion score of the parent comment, a topic of a content item, etc. to the digital magazine server 106.

The digital magazine server 106 receives the report on the new comment provided by the user, and updates 670 the user propensity. Accordingly, the new response can be reflected, when determining likelihood of the user responding to comments in the future, and improve accuracy of the prediction of the likelihood.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method for ranking comments associated with a content item in a digital magazine, the method comprising:
    determining, by a processor, a topic of the content item selected by a user of the digital magazine maintained by a digital magazine server;
    obtaining emotion scores of comments associated with the content item by the processor, an emotion score of a comment representative of sentiments of a plurality of users toward the comment and determined from emoticons attached to response comments to the comment;
    obtaining, by the processor, prior response comments received from the user for comments for content items having the topic;
    determining, by the processor, a user propensity of responding to previous comments for content items having the topic by applying a model to the prior response comments received from the user for comments for content items having the topic and emotion scores for previous comments for content items having the topic for which the user provided one or more response comments;
    determining, by the processor, response likelihood scores of the comments associated with the content item, a response likelihood score of the comment representing a likelihood of the user responding to the comment and determined based on an emotion score for the comment and the user propensity of responding to previous comments for content items having the topic;
    determining a ranking of the comments associated with the content item based on the determined response likelihood scores by the processor; and
    displaying the comments associated with the content item in locations of a display area of a client device of the user based on the ranking.

2. The method of claim 1, wherein displaying the comments associated with the content item in locations of a display area of a client device based on the ranking comprises:
    displaying a first comment having a first response likelihood score in a first display area of client device of the user and displaying a second comment having a lower response likelihood score than the first response likelihood score in a second display area of the client device of the user that is more difficult for the user to access than the first display area.

3. The method of claim 1, wherein different comments of the content item have different likelihood scores based on different emotion scores associated with the different comments according to the topic.

4. The method of claim 1, wherein comments with same emotion scores in different topics have different response likelihood scores.

5. The method of claim 1, further comprising:
receiving a response comment from a client device;
receiving an identification of the user, an identification of a parent comment to which the user provided the response comment, and an updated emotion score of the parent comment; and
updating the user propensity for the topic of the content item based on the updated emotion score.

6. The method of claim 1, wherein the previous comments are associated with different content items.

7. A non-transitory computer-readable storage medium storing executable computer program instructions for ranking comments associated with a content item in a digital magazine, the computer program instructions when executed by a computer processor cause the computer processor to:
determine a topic of the content item selected by a user of the digital magazine maintained by a digital magazine server;
obtain emotion scores of comments associated with the content item, an emotion score of a comment representative of sentiments of a plurality of users toward the comment and determined from emoticons attached to response comments to the comment;
obtaining prior response comments received from the user for comments for content items having the topic;
determining a user propensity of responding to previous comments for content items having the topic by applying a model to the prior response comments received from the user for comments for content items having the topic and emotion scores for previous comments for content items having the topic for which the user provided one or more response comments;
determine response likelihood scores of the comments associated with the content item, a response likelihood score of the comment representing a likelihood of the user responding to the comment and, determined based on an emotion score for the comment and the user propensity of responding to previous comments for content items having the topic;
determine an ranking of the comments associated with the content item based on the determined response likelihood scores; and
display the comments associated with the content item in locations of a display area of a client device of the user based on the ranking.

8. The non-transitory computer-readable storage medium of claim 7, wherein display the comments associated with the content item in locations of the display area of the client device of the user based on the ranking comprises:
display a first comment having a first response likelihood score in a first display area of the client device of the user and display a second comment having a lower response likelihood score than the first response likelihood score in a second display area of the client device of the user that is more difficult for the user to access than the first display area.

9. The non-transitory computer-readable storage medium of claim 7, wherein different comments of the content item have different likelihood scores based on different emotion scores associated with the different comments according to the topic.

10. The non-transitory computer-readable storage medium of claim 7, wherein comments with same emotion scores in different topics have different response likelihood scores.

11. The non-transitory computer-readable storage medium of claim 7, wherein the computer program instructions when executed by a computer processor further cause the computer processor to:
receive a response comment from a client device;
receive an identification of the user, an identification of a parent comment to which the user provided the response comment, and an updated emotion score of the parent comment; and
update the user propensity for the topic of the content item based on the updated emotion score.

12. The non-transitory computer-readable storage medium of claim 7, wherein the previous comments are associated with different content items.

13. A method for ranking comments associated with a content item in a digital magazine, the method comprising:
determining, by a processor, a topic of the content item selected by a user of the digital magazine;
obtaining group emotion scores of groups of comments associated with the content item by the processor, a group emotion score of a group of comments representative of sentiments of a plurality of users toward one or more comments in the group of comments sharing a hierarchical relationship and determined from emoticons attached to comments in the hierarchical relationship of the group of comments;
obtaining, by the processor, prior response comments received from the user for comments for content items having the topic;
determining, by the processor, a user propensity of responding to previous comments for content items having the topic by applying a model to the prior response comments received from the user for comments for content items having the topic and emotion scores for previous comments for content items having the topic for which the user provided one or more response comments;
determining, by the processor, group response likelihood scores of the groups of comments associated with the content item, a group response likelihood score of the group of comments representing a likelihood of the user responding to one of comments in the group and determined based on a group emotion score of the group and the user propensity of responding to previous comments for content items having the topic;
determining, by the processor, a ranking of the groups of comments based on the determined group response likelihood scores; and
displaying the groups of comments associated with the content item in locations of a display area of a client device of the user based on the ranking.

14. The method of claim 13, wherein displaying the groups of comments associated with the content item in locations of a display area of a client device of the user based on the ranking comprises:
displaying a first group of comments having a first group response likelihood score in a first display area of the client device of the user and displaying a second group of comments having a lower group response likelihood score than the first group response likelihood score in a second display area of the client device of the user that is more difficult for the user to access than the first display area.

15. The method of claim 14, wherein the first group of comments is to be presented in the first display area according to a hierarchical relationship of the comments in the first group.

16. The method of claim 13, wherein the previous comments are associated with different content items.

* * * * *

UNITED STATES PATENT AND TRADEMARK OFFICE
CERTIFICATE OF CORRECTION

PATENT NO. : 10,341,278 B2
APPLICATION NO. : 15/231676
DATED : July 2, 2019
INVENTOR(S) : Guy Hawkins Page 1 of 1

It is certified that error appears in the above-identified patent and that said Letters Patent is hereby corrected as shown below:

In the Claims

Column 14, Line 51, delete "one of comments" and insert --one of the comments--

Signed and Sealed this
Twenty-eighth Day of January, 2020

Andrei Iancu
*Director of the United States Patent and Trademark Office*